United States Patent [19]
Hirota et al.

[11] Patent Number: 5,189,876
[45] Date of Patent: Mar. 2, 1993

[54] EXHAUST GAS PURIFICATION SYSTEM FOR AN INTERNAL COMBUSTION ENGINE

[75] Inventors: Shinya Hirota, Susono; Tokuta Inoue, Mishima, both of Japan

[73] Assignee: Toyota Jidosha Kabushiki Kaisha, Toyota, Japan

[21] Appl. No.: 652,193

[22] Filed: Feb. 7, 1991

[30] Foreign Application Priority Data

Feb. 9, 1990 [JP] Japan .................. 2-11563[U]

[51] Int. Cl.$^5$ .................................................. F01N 3/28
[52] U.S. Cl. ........................................... 60/286; 60/303
[58] Field of Search ................... 60/274, 286, 303, 297

[56] References Cited

U.S. PATENT DOCUMENTS

| | | | |
|---|---|---|---|
| 3,635,200 | 1/1972 | Rundell et al. | 123/3 |
| 3,827,238 | 8/1974 | Hayashi | 60/286 |
| 3,908,371 | 9/1975 | Nagai et al. | 60/301 |
| 4,188,364 | 2/1980 | Gladden | 60/274 |

FOREIGN PATENT DOCUMENTS

| | | | |
|---|---|---|---|
| 3615021 | 11/1987 | Fed. Rep. of Germany . | |
| 155523 | 9/1984 | Japan | 60/303 |
| 68714 | 3/1988 | Japan | 60/297 |
| 63-283727 | 11/1988 | Japan . | |
| 1-247710 | 10/1989 | Japan . | |
| 2-233145 | 9/1990 | Japan . | |

*Primary Examiner*—Douglas Hart
*Attorney, Agent, or Firm*—Kenyon & Kenyon

[57] ABSTRACT

An exhaust gas purification system for an internal combustion engine includes an engine 1 capable of fuel combustion at lean air-fuel ratios, a lean NOx catalyst 3 installed in an exhaust conduit 16 of the engine, an HC producing means for producing hydrocarbons of low boiling points utilizing fuel for the engine, and an HC supply means for supplying the hydrocarbons of low boiling points to the exhaust conduit upstream of the lean NOx catalyst 3. NOx reduction reaction needs hydrocarbons of low boiling points. The HC producing means produces hydrocarbons of low boiling points from diesel oil by cracking, fractional distillation, or both cracking and fractional distillation. The cracked and/or distilled fuel includes a large amount of hydrocarbons of low boiling points and increases NOx purification rate of the lean NOx catalyst when the hydrocarbons of low boiling points are introduced into the exhaust conduit by the HC supply means.

12 Claims, 5 Drawing Sheets

EXHAUST GAS PURIFICATION SYSTEM FOR AN INTERNAL COMBUSTION ENGINE

BACKGROUND OF THE INVENTION

1. Field of the Invention

The present invention relates to an exhaust gas purification system for an internal combustion engine provided with a catalyst capable of reducing nitrogen oxides (hereinafter, NOx) under oxidizing conditions and in the presence of hydrocarbons. More particularly, the present invention relates to an exhaust gas purification system wherein hydrocarbons having low boiling points produced from a fuel for the engine is supplied to the catalyst to increase a NOx purification rate of the catalyst.

2. Description of the Prior Art

Combustion at lean air-fuel ratios is effective to improve a mileage characteristic of automobile internal combustion engines, and such lean air-fuel combustion (lean burn) is actually executed in diesel engines and some types of gasoline engines. However, in the lean burn engine, NOx reduction by a three-way catalyst cannot be expected, and therefore, an alternative means for reducing NOx needs to be developed.

As a catalyst capable of reducing NOx even under an oxidizing exhaust gas condition of the lean burn engines, Japanese Patent Publication HEI 1-130735 discloses a zeolite catalyst carrying transition metals which can reduce NOx in the presence of hydrocarbons. Also, Japanese Patent Publication SHO 63-283727 proposes an apparatus for supplying hydrocarbons to an engine exhaust conduit upstream of the zeolite type catalyst. However, the apparatus includes a particular hydrocarbon source different from the fuel for the engine, and installation of such particular hydrocarbon source would increase cost.

To avoid installing such particular hydrocarbon source, it could be conceived to utilize a portion of the fuel for the engine to supply hydrocarbons to the zeolite type catalyst. However, it was found by the inventors through various tests that merely using fuel will not improve the NOx reduction rate of the zeolite type catalyst. More particularly, the hydrocarbons effective to reduce NOx have a relatively small carbon number (for example, 3-6) per molecule. In contrast, diesel fuel (light oil) mainly includes hydrocarbons having a large carbon number (for example, more than 10) per molecule. As a result, even if the fuel is supplied to the zeolite type catalyst, significant increase of NOx purification rate cannot be expected.

SUMMARY OF THE INVENTION

An object of the invention is to improve NOx purification rate of a zeolite type NOx reduction catalyst installed in an exhaust system of an internal combustion engine by supplying hydrocarbons having low boiling points (that is, hydrocarbons having a relatively small carbon number per molecule) without installing a particular hydrocarbon source different from the fuel used for combustion in the engine.

This object can be attained by an exhaust gas purification system for an internal combustion engine in accordance with the present invention. The system includes an internal combustion engine capable of fuel combustion at lean air-fuel ratios, a catalyst installed in an exhaust conduit of the engine and constructed of zeolite carrying at least one kind of metal selected from transition metals and noble metals to reduce nitrogen oxides included in exhaust gas from the engine under oxidizing conditions and in the presence of hydrocarbons (hereinafter, a lean NOx catalyst), HC producing means for producing hydrocarbons of low boiling points from fuel for the engine, and HC supply means for supplying the hydrocarbons of low boiling points produced by the HC producing means to the exhaust conduit upstream of the lean NOx catalyst.

The HC producing means produces hydrocarbons of low boiling points by any one of cracking, fractional distillation, and combined cracking and fractional distillation, utilizing at least a portion of the fuel for combustion in the engine in the case of diesel engines. The produced hydrocarbons of low boiling points are supplied to the lean NOx catalyst to increase the NOx purification rate or NOx reduction rate of the lean NOx catalyst.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 8:
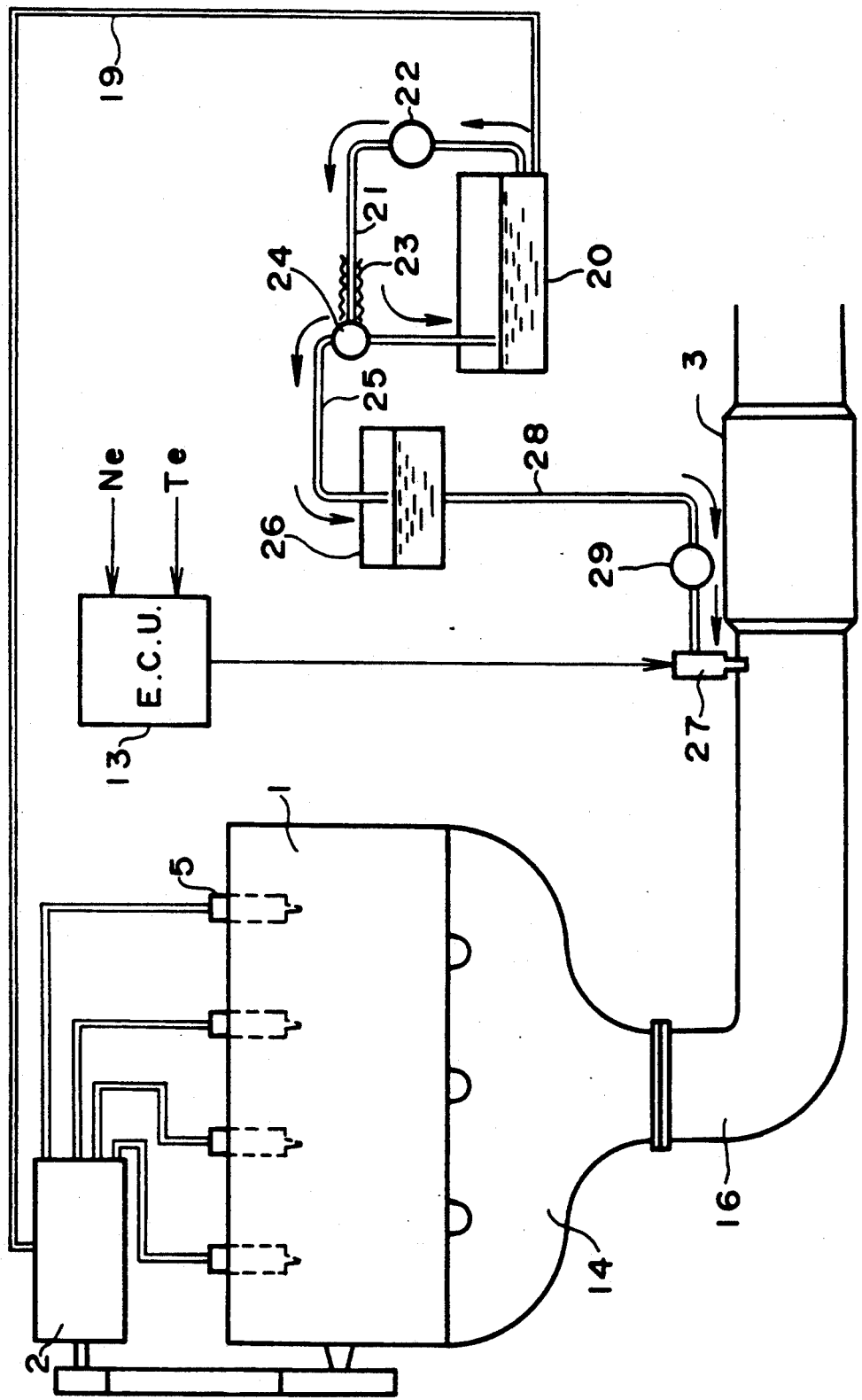
FIG. 8 is a schematic system diagram of an exhaust gas purification system for an internal combustion engine in accordance with a second embodiment of the present invention.
Figure 9:
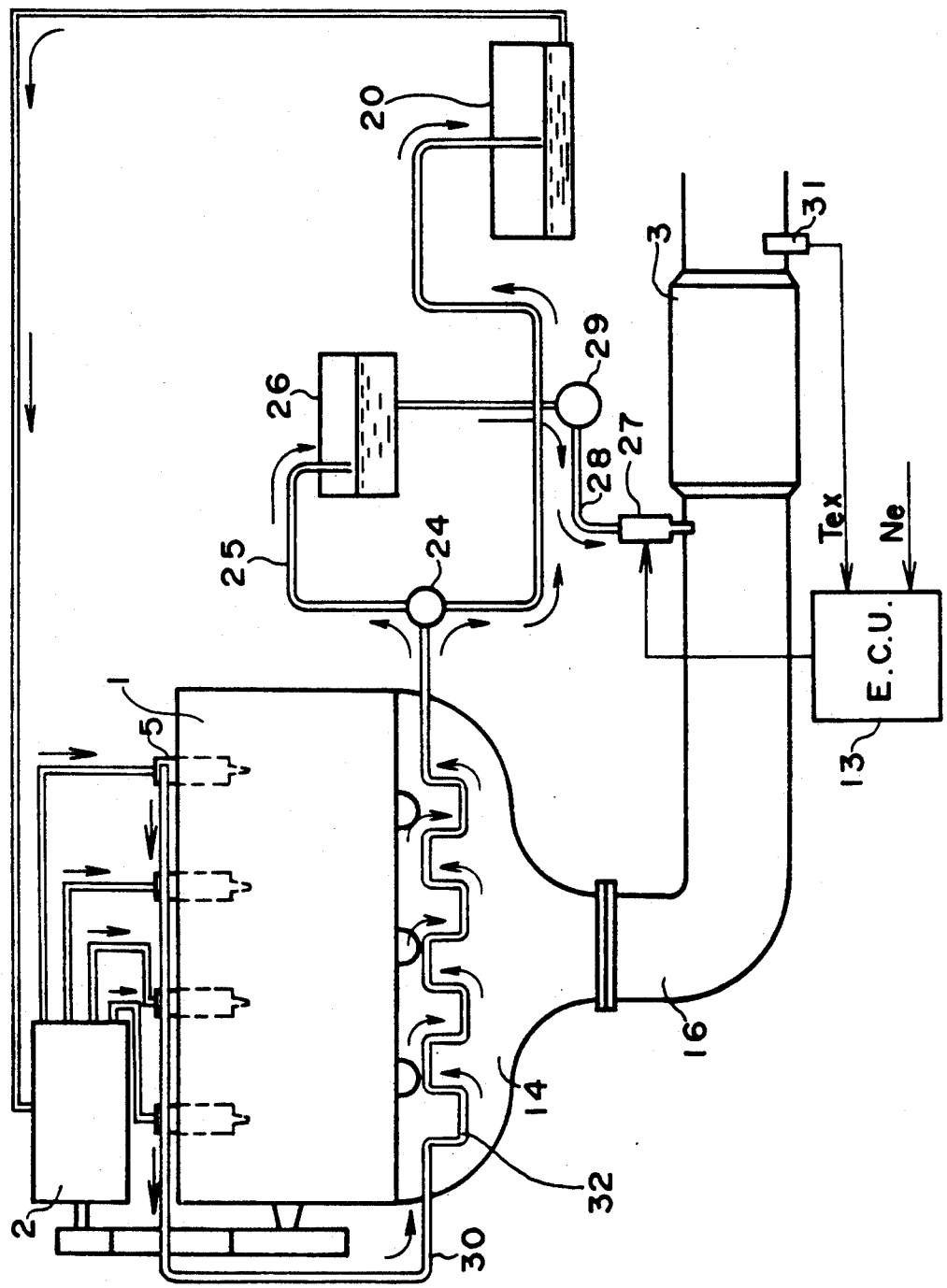
FIG. 9 is a schematic system diagram of an exhaust gas purification system for an internal combustion engine in accordance with a third embodiment of the present invention.

Three embodiments of the invention will be explained below. In a first embodiment, the hydrocarbons of low boiling points are produced by cracking at least a portion of the engine fuel (diesel fuel), as illustrated in FIGS. 1-7. In a second embodiment, hydrocarbons of low boiling points are produced through fractional distillation of the fuel, as illustrated in FIG. 8. In a third embodiment, hydrocarbons of low boiling points are produced through combined cracking and fractional distillation of the fuel, as illustrated in FIG. 9.

Figure 1:
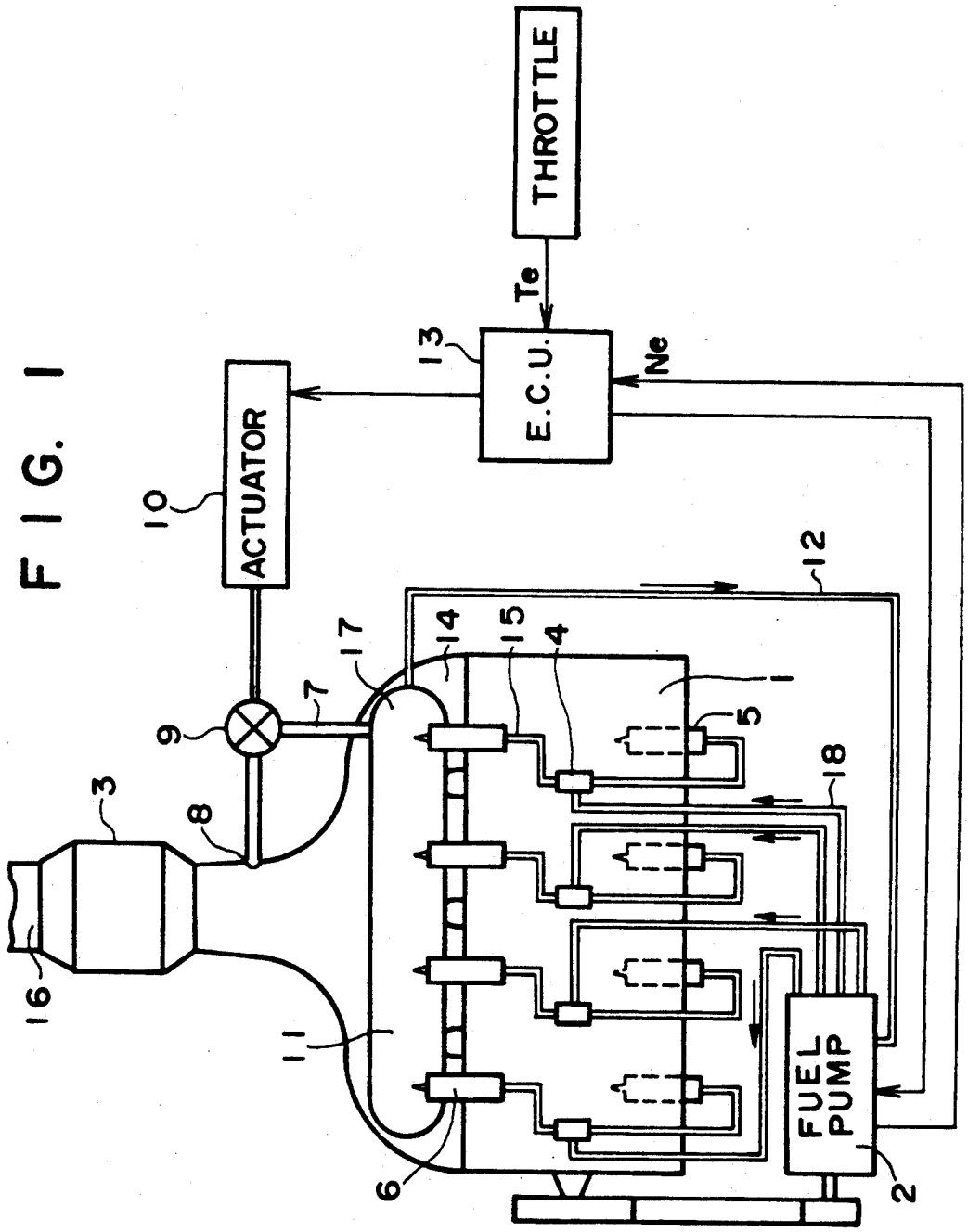
FIG. 1 is a schematic system diagram of an exhaust gas purification system for an internal combustion engine in accordance with a first embodiment of the present invention.
Figure 2:
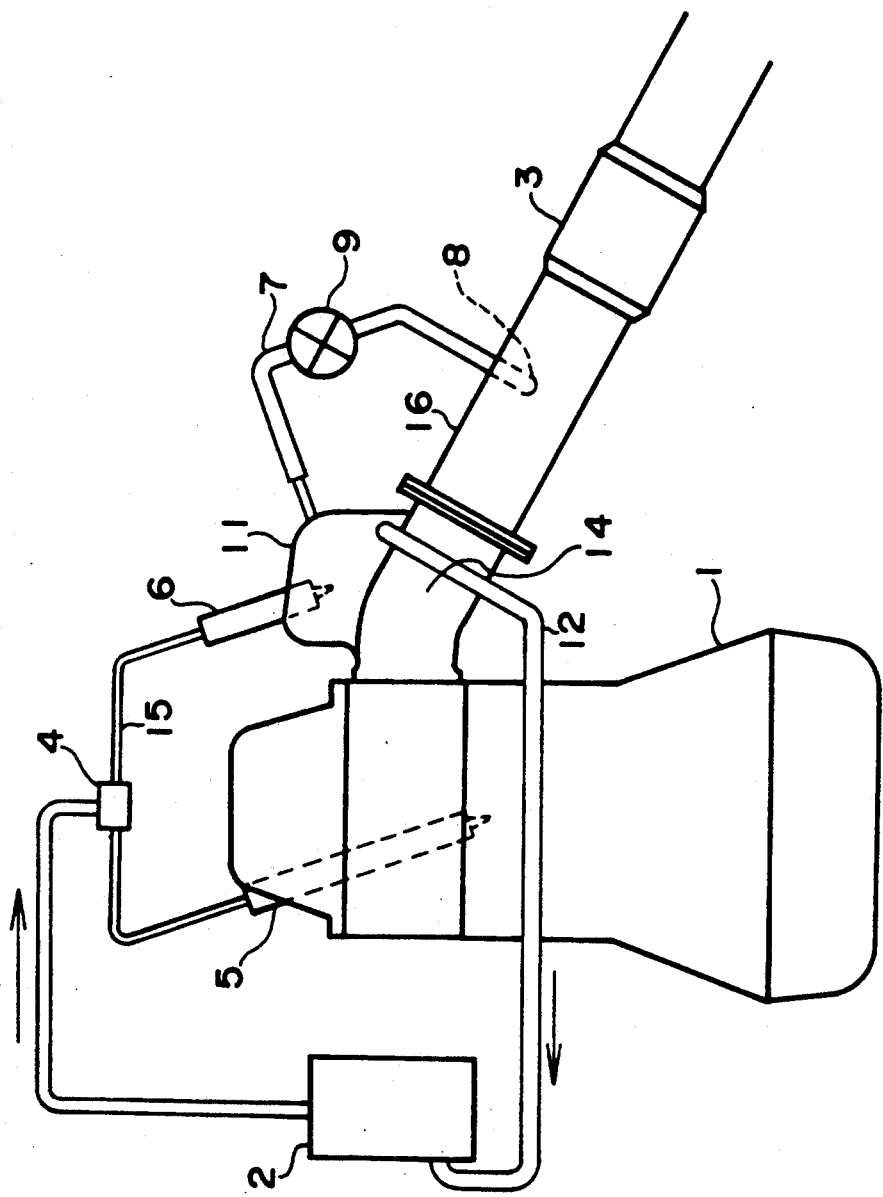
FIG. 2 is a schematic elevational side view of the exhaust gas purification system for an internal combustion engine of FIG. 1.

The first embodiment will now be explained. In FIGS. 1 and 2, an engine 1 capable of fuel combustion at lean air-fuel ratios comprises a diesel engine. Diesel fuel (light oil) is supplied by a fuel pump 2 and is injected into each cylinder of the engine through a respective fuel injection nozzle 5. An exhaust conduit 16 is connected to the engine, and a lean NOx catalyst 3 is installed in the exhaust conduit 16 for purifying the exhaust gas. Since the diesel engine 1 is operated at lean air-fuel ratios, the exhaust gas contains excess oxygen, so that the lean NOx catalyst 3 can reduce NOx in the presence of HC.

An exhaust manifold 14 of the engine is provided with a fuel cracking chamber 11, which is located preferably above the exhaust manifold 14. A manifold wall 17 separating the fuel cracking chamber 11 from the interior of the exhaust manifold 14 has a large heat transfer area so that the fuel cracking chamber 11 can be heated to a temperature above 500° C.

A fuel supply pipe 18 extending from the fuel pump 2 to each fuel injection nozzle 5 has a diverging portion such as a T-fitting 4 from which a branch pipe 15 extends to the fuel cracking chamber 11 so that a portion of the diesel fuel is fed into the fuel cracking chamber 11 through an injection nozzle 6 mounted on the fuel cracking chamber 11. The fuel pump 2, the diverging portion 4, the branch pipe 15, the injection nozzle 6, and the fuel cracking chamber 11 constitute an HC producing means for producing hydrocarbons of low boiling points by cracking a portion of the engine fuel.

A cracked-fuel supply pipe 7 extends from the fuel cracking chamber 11 to a cracked-fuel injection port 8 located in the exhaust conduit 16 upstream of the lean NOx catalyst 3. A flow control valve 9 is installed in the cracked-fuel supply pipe 7. Opening degree of the flow control valve 9 is controlled by an actuator 10 which constitutes, for example, a duty control solenoid. The cracked-fuel supply pipe 7, the cracked-fuel injection portion 8, the flow control valve 9, and the actuator 10 constitute an HC supply means for supplying the cracked fuel (hydrocarbons of low boiling points) to the exhaust conduit 16 upstream of the lean NOx catalyst 3.

A fuel return pipe 12 for returning excess fuel remaining in the fuel cracking chamber 11 (fuel which has not been fed to the lean NOx catalyst 3) to the fuel pump 2 is provided at the bottom of the fuel cracking chamber 11.

Figure 3:
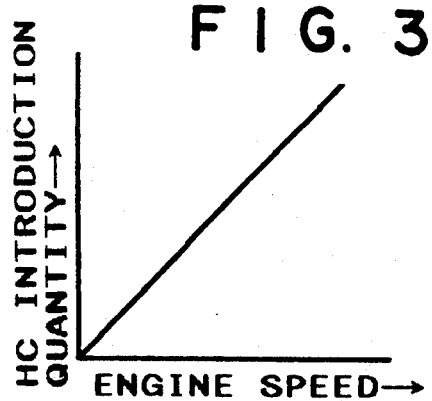
FIG. 3 is a graphical representation of a map of introduced hydrocarbon quantity versus engine speed for the exhaust gas purification system for an internal combustion engine of FIG. 1.
Figure 4:
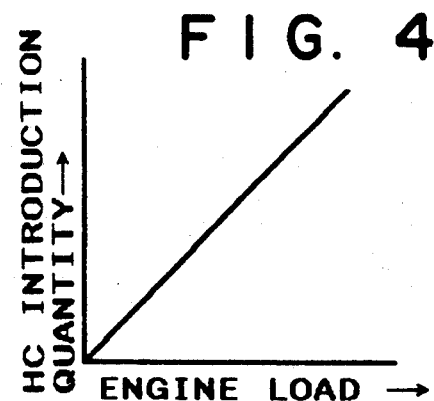
FIG. 4 is a graphical representation of a map of introduced hydrocarbon quantity versus engine load for the exhaust gas purification system for an internal combustion engine of FIG. 1.
Figure 5:
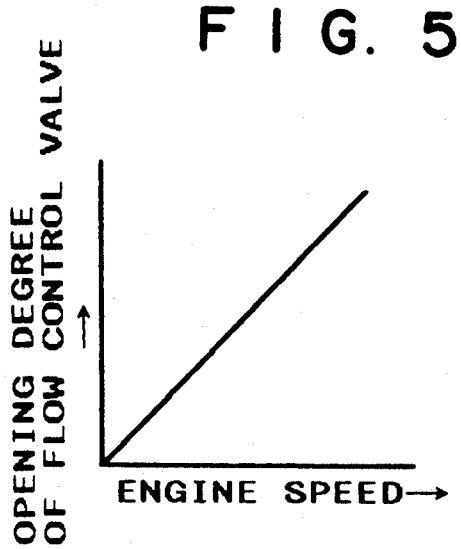
FIG. 5 is a graphical representation of a map of opening degree of a flow control valve versus engine speed for the exhaust gas purification system for an internal combustion engine of FIG. 1.
Figure 6:
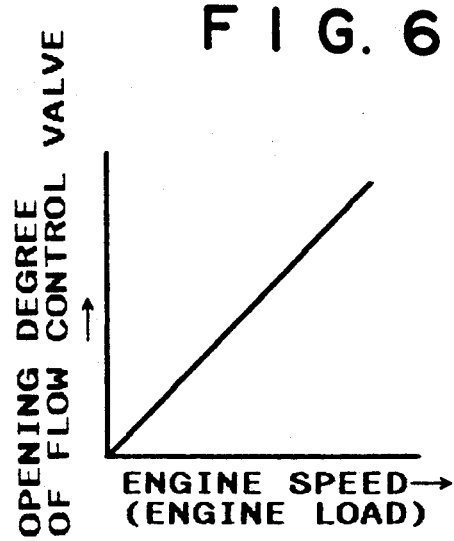
FIG. 6 is a graphical representation of a map of opening degree of a flow control valve versus engine load (fuel injection quantity) for the exhaust gas purification system for an internal combustion engine of FIG. 1.
Figure 7:
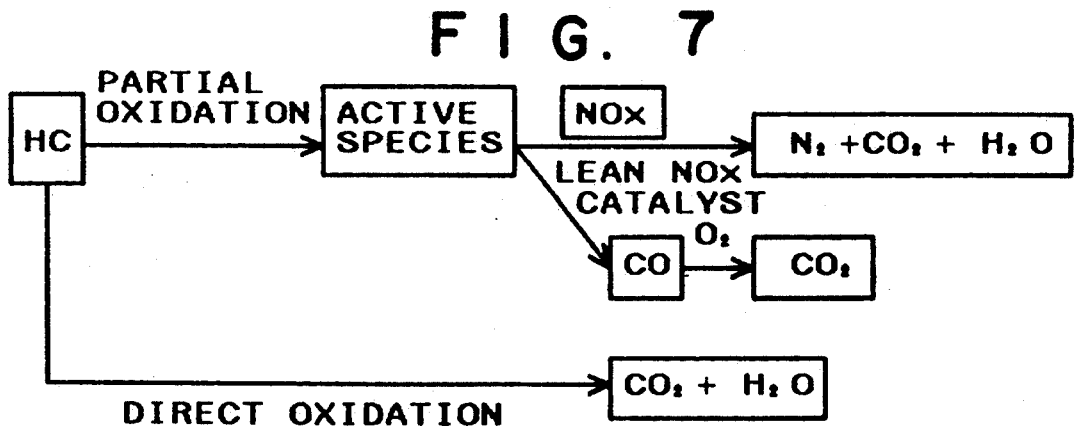
FIG. 7 is a block diagram illustrating a NOx reduction mechanism of a lean NOx catalyst.

An electronic control unit 13 (hereinafter, ECU) is provided to control the quantity of the cracked fuel fed to the exhaust conduit upstream of the lean NOx catalyst 3. The ECU 13 controls the flow control valve 9 via the actuator 10 as a function of engine speed Ne, so that the opening degree of the flow control valve and thus quantity of fuel supplied increase with increasing engine speed, as illustrated in FIG. 5 and FIG. 3, respectively. Also, the ECU 13 controls the flow control valve 9 as a function of engine load Te, so that the opening degree of the flow control valve and thus the quantity of the supplied fuel increase with increasing engine load (that is, quantity of fuel injected into the cylinders or opening degree of a throttle valve), as illustrated in FIG. 6 and FIG. 4, respectively.

The fuel injectors 5 are electromagnetically operated, and the injection timing and fuel injection quantity thereof is controlled by the ECU 13.

The operation of the first embodiment will now be explained. A portion (about 10%) of the diesel fuel is fed to the fuel cracking chamber 11 though the injection nozzles 6. This fuel receives heat via the manifold wall 17 from the exhaust gas flowing inside the exhaust manifold and is cracked into hydrocarbons having small carbon numbers (for examples, 3–6) per molecule and therefore, hydrocarbons of low boiling points. This cracking will be caused when the manifold wall is heated to a temperature above about 500° C. A coating of platinum or palladium on the interior of the manifold wall 17 is effective to crack hydrocarbons at wall temperatures below 500° C.

The quantity of hydrocarbons necessary to reduce NOx by the lean NOx catalyst 3 is about 3–5% of the fuel amount to be injected into the cylinders. The fuel fed to the fuel cracking chamber 11 is controlled to the necessary quantity by the flow control valve 9 and is fed to the exhaust conduit upstream of the lean NOx catalyst 3. The remaining cracked fuel is returned to the fuel pump 2 via the fuel return pipe 12. Since the pressure of the fuel cracking chamber 11 is raised to about 2.8 atms. (=(273+500)/273) and the pressure is considerably higher than the exhaust gas pressure, the exhaust gas does not backflow into the cracked-fuel supply pipe 7.

The hydrocarbons of low boiling points introduced into the exhaust conduit 16 upstream of the lean NOx catalyst 3 flow to the lean NOx catalyst 3 where at least a portion of the hydrocarbons is partially oxidized to some active species or radicals (for example, species like CO−). The active species react with NOx in accordance with the mechanism of FIG. 7 to reduce NOx and purify the exhaust gas. Due to the supply of the hydrocarbons of low boiling points, the quantity of the active species produced at the lean NOx catalyst 3 is increased to thereby increase the lean NOx purification rate of the lean NOx catalyst 3.

Though the engine 1 comprises a diesel engine in the foregoing explanation, the engine may comprise a gasoline engine operated at lean air-fuel ratios.

Next, the second embodiment of the present invention will be explained with reference to FIG. 8. Members of the second embodiment having structures and functions similar to those of the members of the first embodiment (that is, a diesel engine 1, a fuel pump 2, a lean NOx catalyst 3, a fuel injection nozzle 5, an ECU 13, and an exhaust conduit 16 of the second embodiment) are denoted with like reference numerals and explanation therefore will be omitted. Explanation will be restricted to members having different structures and functions.

A fuel recirculation conduit 21 is provided for a fuel tank 20 independently of a fuel pipe 19 for supplying fuel to the fuel pump. A fuel circulation pump 22 and a heater 23 for heating the circulated fuel to a temperature above about 350° C. are provided in the fuel circulation conduit 21. A gas/liquid separator 24, for separating gas components from liquid components of the fuel which has been heated by the heater 23 to include gas components and liquid components, is installed in the fuel circulation conduit downstream of the heater 23. The evaporated fuel mainly includes hydrocarbons of relatively low boiling points, and the remaining liquid fuel mainly includes hydrocarbons of relatively high boiling points. The gas/liquid separator 24 is connected with HC tank 26 via a pipe 25, so that the gas components of the fuel separated by the separator 24 are led via the pipe 25 into the HC tank 26 to be cooled to 200-300° C. and to be changed to an HC liquid of low boiling points. The fuel circulation conduit 21, the fuel circulation pump 22, the heater 23, the gas/liquid separator 24, and the HC tank 26 constitute means for producing hydrocarbons of low boiling points mainly through fractional distillation (reaction to extract the hydrocarbons of low boiling points utilizing the difference of boiling points of components of the hydrocarbons).

The HC tank 26 is connected via a pipe 28 with an HC injection nozzle 27 installed in the exhaust conduit 16 upstream of the lean NOx catalyst 3. Also, an HC supply pump 29 is installed in the pipe 28. The HC supply pump 29 raises the pressure of the hydrocarbons of low boiling points from the HC tank 25, and the HC injection nozzle 27 opens to introduce the pressurized hydrocarbons into the portion of the exhaust conduit upstream of the lean NOx catalyst 3. The ECU 13 reads signals of a current engine speed Ne and a current engine load Te (e.g., an opening degree of an accelerator) and calculates a necessary HC injection quantity on the basis of a Te versus Ne map to send an instruction to the HC injection nozzle 27 that the HC injection nozzle should inject hydrocarbons by the calculated HC quantity. The pipe 28, the HC injection nozzle 27, the HC supply pump 29, and the ECU 13 constitute means for supplying hydrocarbons of low boiling points to the exhaust conduit 16 upstream of the lean NOx catalyst 3 in the second embodiment.

The operation of the exhaust gas purification system of the second embodiment will now be explained. A portion of the fuel stored in the fuel tank 20 is circulated by the fuel circulation pump 22 and heated by the heater 23. The hydrocarbons of low boiling points are distilled at the gas/liquid separator 24 and are extracted from the remaining fuel, which is recirculated to the HC tank 26. Since the hydrocarbons of low boiling points are introduced into the exhaust conduit upstream of the lean NOx catalyst 3 via the HC injection nozzle 27, the NOx purification rate of the lean NOx catalyst is increased. Although diesel fuel includes many components having a large carbon number (for example, equal to or more than 15) per molecule and therefore having little effect in NOx reduction, the extracted hydrocarbons mainly comprises hydrocarbons having small carbon numbers per molecule and therefore having low boiling points to effectively reduce NOx. In addition, introduction of the hydrocarbons of low boiling points does not raise an HC emission problem, because almost all of the hydrocarbons of low boiling points are oxidized at the lean NOx catalyst 3. In contrast, if hydrocarbons of high boiling points were supplied, the hydrocarbons would not be completely oxidized at the lean NOx catalyst and an HC emission problem would result.

Next, the third embodiment of the invention will be explained with reference to FIG. 9. In the third embodiment, explanation for members having structures and functions similar to those of the members of the first embodiment or the second embodiment (a diesel engine 1, a fuel pump 2, a lean NOx catalyst 3, a fuel injection nozzle 5, an ECU 13, an exhaust manifold 14, an exhaust conduit 16, a fuel tank 20, a gas/liquid separator 24, a pipe 25, an HC tank 26, an HC injection nozzle 27, a pipe 28, and an HC supply pump 29) is omitted by denoting like reference numerals to the members.

As illustrated in FIG. 9, a fuel return pipe 30 for returning fuel from the fuel injection nozzles 5 to the fuel tank is zigzagged in the vicinity of the exhaust manifold 14 so that the returning fuel receives as much heat as possible from the exhaust manifold 14 and at least a portion of the returning fuel is cracked in the zigzag portion 32. At least a portion of the components of low boiling points included in the returning fuel and the cracked fuel will be evaporated while the returning fuel flows through the zigzag portion 32. The gas portion of the returning fuel is separated from the liquid portion at the gas/liquid separator 24 which is positioned downstream of the zigzag portion 32. The separated gas components of low boiling points are led to the HC tank 26 via the pipe 25 where they are cooled to a liquid. The fuel return pipe 30, the zigzag portion 32, the gas/liquid separator 24, the pipe 25, and the HC tank 26 constitute HC producing means for producing hydrocarbons of low boiling points using a portion of the fuel for combustion in the engine in the third embodiment.

Also, the pipe 28 connecting the HC tank 26 and the HC injection nozzle 27, the HC supply pump 29, the HC injection nozzle 27, and the ECU 13 constitute HC supply means for supplying the hydrocarbons of low boiling points stored in the HC tank 26 into the exhaust conduit 16 upstream of the lean NOx catalyst 3 in the third embodiment. In this instance, the ECU 13 sends an instruction to the HC injection nozzle 27 so that the HC injection nozzle 27 injects the hydrocarbons by the amount that is calculated in the ECU 13 on the basis of an engine speed (Ne) versus an exhaust gas temperature (Tex) map.

The operation of the third embodiment will now be explained. The returning fuel is partially cracked and partially evaporated at the zigzag portion 32 of the fuel return pipe 30. The evaporated fuel is separated from the liquid fuel at the gas/liquid separator 24 and is led to the HC tank 26 where the evaporated fuel is cooled to a liquid and stored. The hydrocarbons stored in the HC tank 26 mainly include hydrocarbons of low boiling points. When the hydrocarbons are introduced into the exhaust conduit 16 upstream of the lean NOx catalyst 3, the hydrocarbons increase the NOx purification rate of the lean NOx catalyst 3.

In accordance with any embodiment of the present invention, the following advantages are obtained:

First, hydrocarbons of low boiling points can be introduced into the exhaust conduit 16 upstream of the lean NOx catalyst 3.

Second, the introduction of the hydrocarbons of low boiling points increases the NOx purification rate of the lean NOx catalyst 3.

Third, the improvement of the lean NOx purification rate of the lean NOx catalyst is attained without installation of a particular hydrocarbon source different from the fuel source.

Fourth, introduction of hydrocarbons of low boiling points rather than of high boiling points suppresses HC emission.

Although a few embodiments of the invention have been described in detail above, it will be appreciated by those skilled in the art that various modifications and alterations can be made to the particular embodiments shown without materially departing from the novel teachings and advantages of the invention. Accordingly, it is to be understood that all such modifications and alterations are included within the spirit and scope of the invention as defined by the following claims.

What is claimed is:

1. An exhaust gas purification system for an internal combustion engine comprising:
   the internal combustion engine being capable of fuel combustion at lean air-fuel ratios, the engine having an exhaust manifold and an exhaust conduit connected to the manifold;
   a catalyst installed in the exhaust conduit of the engine and constructed of zeolite carrying at least one kind of metal selected from transition metals and noble metals, said catalyst being employed to reduce nitrogen oxides included in exhaust gas from the engine under oxidizing conditions and in the presence of hydrocarbons;
   an HC producing means for producing hydrocarbons of low boiling points from fuel for combustion in the engine by subjecting at least a portion of the fuel for combustion to a process selected from the group including cracking and fractional distillation; and
   an HC supply means for supplying the hydrocarbons of low boiling points produced by the HC producing means to the exhaust conduit upstream of the catalyst.

2. An exhaust gas purification system for an internal combustion engine according to claim 1, wherein the HC producing means comprising means for producing hydrocarbons of low boiling points by cracking at least a portion of the fuel for the engine.

3. An exhaust gas purification system for an internal combustion engine according to claim 2, wherein the HC producing means comprises a fuel cracking chamber provided adjacent to and separated from the exhaust manifold by a heat conductive manifold wall.

4. An exhaust gas purification system for an internal combustion engine according to claim 3, wherein the HC producing means includes an injection nozzle provided at the fuel cracking- chamber for injecting fuel into the fuel cracking chamber and a branch pipe leading fuel from a fuel pump to the injection nozzle.

5. An exhaust gas purification system for an internal combustion engine according to claim 2, wherein the HC supply means includes a pipe extending from the fuel cracking chamber to the exhaust conduit upstream of the catalyst and a flow control valve installed in the pipe.

6. An exhaust gas purification system for an internal combustion engine according to claim 2, wherein the internal combustion engine comprises a diesel engine, and the fuel for combustion in the engine comprises light oil.

7. An exhaust gas purification system for an internal combustion engine according to claim 1, wherein the HC producing means includes means for producing hydrocarbons of low boiling points by fractional distillation of at least a portion of the fuel for combustion in the engine.

8. An exhaust gas purification system for an internal combustion engine according to claim 7, wherein the HC producing means comprises a fuel circulation pipe for circulating at least a portion of the fuel for combustion in the engine, a heater provided at a portion of the fuel circulation pipe so as to heat the circulated fuel to evaporate at least a portion of the circulated fuel, and a gas/liquid separator provided in the circulation pipe downstream of the heater for separating the evaporated portion from liquid components of the circulated fuel.

9. An exhaust gas purification system for an internal combustion engine according to claim 7, wherein the HC supply means comprises an HC injection nozzle for injecting the hydrocarbons of low boiling points into the exhaust conduit upstream of the catalyst, a pipe for leading the hydrocarbons of low boiling points to the HC injection nozzle, and an HC supply pump for pressurizing the hydrocarbons of low boiling points.

10. An exhaust gas purification system for an internal combustion engine according to claim 1, wherein the HC producing means includes means for producing hydrocarbons of low boiling points by both cracking and fractional distillation of at least a portion of the fuel for combustion in the engine.

11. An exhaust gas purification system for an internal combustion engine according to claim 10, wherein the HC producing means includes a fuel pump, a fuel return pipe connected to the fuel pump, a zigzag portion formed in the fuel return pipe in the vicinity of the exhaust manifold, and a gas/liquid separator located in the fuel return pipe downstream of the zigzag portion.

12. An exhaust gas purification system for an internal combustion engine according to claim 10, wherein the HC supply means includes an HC injection nozzle provided at the exhaust conduit upstream of the catalyst and an HC supply pump for pressurizing the hydrocarbons of low boiling points.

* * * * *